3,073,724
PROCESS FOR PREPARING IMPROVED SIZING AGENTS FROM CEREAL FLOURS
John C. Rankin, Charles R. Russell, and John H. Samalik, Sr., Peoria, Ill., assignors to the United States of America as represented by the Secretary of Agriculture
No Drawing. Filed May 5, 1961, Ser. No. 108,216
1 Claim. (Cl. 127—38)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved process for treating cereal flours with weak aqueous solutions of hydrochloric or other mineral acids under critically defined conditions which give rise to acid-modified starches and cereal flours of low viscosities at high solids concentrations, little or no tendency of their pastes to retrograde or setback, and retention of the high strength values, all properties which render the modified starches useful with modern high speed machines in the coating and sizing industries.

It is well known that the extensive degradative depolymerizations that characterize the thin boiling starches and the dextrins greatly weaken or destroy the film strength properties of these products, thus limiting or preventing any substantial strengthening of paper and textiles sized therewith.

Broadly stated, the principal object of our invention is the long sought discovery of the specific conditions for processing a starchy material that consists essentially of intimately associated branched and linear components (amylopectin and amylose, respectively) in the presence or absence of protein (gluten) so as to concurrently but differentially depolymerize the said branched and linear components respectively to major and minor extents which will provide not only the expected reduced paste viscosity but which will also provide markedly reduced setback and retrogradation tendencies without the heretofore associated extensive loss of the strength-contributing properties that are known to reside to an even greater degree in undepolymerized amylose than in undepolymerized amylopectin.

A further and more specific object is a process by which even the least expensive starchy raw material, namely cereal flour, notwithstanding its protein content (about 8.8 percent in soft wheat flour and about 14.3 percent in hard wheat flour), can be very selectively partially depolymerized to give improved sizing agents for paper and textiles, which agents retain the high strength properties of undegraded starch sizing agents while also acquiring the aforesaid properties of low paste viscosity and improved pasting characteristics.

Our process involves first drying raw (ungelatinized) flour to a critical moisture content of 0.7–1.4 percent at 40–100° C. (thus avoiding gelatinization or depolymerization of the intact granules and denaturation of associated gluten) spraying the substanially dry flour with about 9 ml. to 11 ml. of a 2 N to 6 N solution of mineral acid, preferably hydrochloric acid, per 100 g. of flour (equivalent to 0.8–2.5 percent of HCl based on the weight of the flour) with vigorous agitation and intimate mixing that is continued for the 1–8 hours of reaction at not above 40° C. (25°–35° C. preferred), and terminating the reaction by neutralizing the acid in the flour with an approximately neutralizing amount of sprayed aqueous alkali to yield free-flowing flour products.

The critical condition of our process apparently favor a rather highly selective depolymerization of the nonlinear (amylopectin) component of starch and flour accompanied by only a very limited degree of depolymerization of the linear (amylose) fraction without introducing any detectable extent of branching. The minor extent to which the amylose content is depolymerized in flour treated by our process is shown by the relatively minor reductions in the "blue values" obtained (Table II, last column). This very specific and critically limited depolymerization of the amylose is apparently just sufficient to lower the paste viscosities to useful levels without being so extensive as to impair the strength qualities of the amylose fraction. Comparison of individual granules of untreated flour and of flour modified by our process under both conventional and polarizing microscopes show no visible changes or differences in the intact granules. It will be noted that flours treated at 45° C. or above, resulted in cereal flour products having markedly inferior strength contributing values.

A Brabender amylograph was calibrated in centipoises (cps.) with Bureau of Standard oils and operated as follows. Aqueous slurries of samples were heated from 25° up to 90° C. (1½° C./min.), held at 90° C. for 17 minutes, and then cooled at the same rate to 25° C. The bowl speed of the amylograph was 75 r.p.m. The reported viscosity value at 55° C. during the cooling cycle simulates commercial application conditions. A calibrated Brookfield Syncho-Lectric viscometer, Model LVF, was used to measure "set-back" viscosity at 25° C.

Ethylene oxide values were determined by the method reported in Anal. Chem. 28, 892 (1956). Blue values, which indicate the quantity of linear molecules (amylose) sufficiently long to absorb iodine, were obtained by the method given in JACS 65, 1154 (1943). The burst, fold, and tensile strength values of sized paper were determined by TAPPI procedures T403m, T423m, and T404m respectively.

The invention is demonstrated by the following examples.

EXAMPLE 1

202 g. of dried commercial wheat flour (moisture content 1.16 percent) was placed in a reaction vessel provided with a mechanical stirrer. As the flour was being agitated at approximately 340 r.p.m., 21.5 ml. of 6 N hydrochloric acid (4.65 g. HCl) equivalent to 2.32 percent of the weight of the flour was sprayed into the material through an atomizer. The depolymerization reaction was continued for 6 hours with constant agitation at a temperature of 28° C. The reaction was arrested by adding 5.1 g. of dry, powdered sodium hydroxide, and mixing was continued for 2 hours more. The product was then removed from the reaction vessel and was noted to be a finely divided free-flowing powder. The acid-modified flour was obtained in quantitative yield and contained about 10 percent moisture. Amylograms showed that a 20 percent aqueous paste of the product had a viscosity of 103 cps. at 55° C. The smooth viscid paste did not retrograde or gel on standing at room temperature for one week and had a pH value of 5.0.

EXAMPLE 2

A twin-shell blender was charged with 2,092 g. of pre-dried commercial wheat flour (moisture content 0.69 percent). The blender was equipped with an atomizer and liquid feed bar for atomizing solutions of reagents into the mixing material. A total of 204 ml. of 2 N hydrochloric acid (16.5 g. HCl) equivalent to 0.80 percent of the weight of the flour, was added over a period of 15 minutes through the feed bar rotating at 3400 r.p.m. Tumbling of the flour in the blender at 24 r.p.m. was continued for 3 hours at 30° C. The reaction was then neutralized by the addition of 32 ml. of 14 N NaOH (18.1 g.) through the liquid feed bar and the tumbling was continued for a further 2-hour period. The product was removed and noted to have the same properties as preparation 1 except that an amylograph paste viscosity of 576 cps. at 55° C. at 20 percent concentration was obtained from this acid-modified flour.

EXAMPLE 3

Acid-modified wheat flour of Example 1 (115 g.) was placed in a pressure-tight vessel provided with a combination vacuum-pressure gage, and an sigma-blade agitator. After evacuating the vessel to a 28-inch vacuum, ethylene oxide gas was admitted to the reaction chamber until the pressure therein reached atmospheric pressure. Additional amounts of ethylene oxide were added at intervals when the pressure dropped due to absorption by the acid-modified flour. A total of 2.4 percent by weight of ethylene oxide was introduced over a period of 7½ hours. During this reaction period the reactants were maintained at 26° C. and kept under constant agitation. The hydroxyethylated acid-modified flour was then removed from the reactor and was noted to be a finely divided free-flowing powder. The product was obtained in quantitative yield and contained about 9 percent moisture. Amylograms showed a 20 percent aqueous paste of the product to have a viscosity of 65 cps. at 55° C. The smooth viscid paste did not retrograde or gel on standing and had a pH value of 8.0.

EXAMPLE 4

202 g. of dried hydroxyethylated wheat flour (moisture content and ethylene oxide content 0.70 and 3 percent, respectively) was placed in a reaction vessel provided with a stirrer. As the flour was being agitated at about 340 r.p.m., 21.4 ml. of 4 N hydrochloric acid (3.19 g. HCl) equivalent to 1.60 percent of the flour weight was atomized onto the material. The reaction was continued for 6 hours, with agitation, at a temperature of 28° C. Neutralization was obtained by adding 3.54 g. of dry, powdered sodium hydroxide and continuing the mixing for 2 hours more. The product was removed and noted to have the same properties as the product of Example 3 except that an amylograph paste viscosity of 556 cps. at 55° C. at 20 percent concentration was obtained from this acid-modified hydroxyethylated flour.

EXAMPLE 5

The processes of Examples 1–4 were applied to a variety of starch-bearing materials to show some of the various viscosities that can be obtained by the substantially dry-low temperature acid depolymerizations. The cereal flour, amount of acid used for depolymerization, percentage of substituted ethylene oxide (when employed), and time and temperature of reaction are reported in Table I.

Table I

| Run No. | Product | Pre-reacted moisture content, percent | Reaction Hrs. | Reaction °C. | Reagents, percent weight of flour Percent $C_2H_4O$ | Percent HCl | Cc.'s added per 100 g. flour | Normality of HCl soln. | Paste viscosity, 20%, cps., amylograph 55° C. |
|---|---|---|---|---|---|---|---|---|---|
| 1 | Acid modified wheat flour of Ex. 2, then hydroxyethylated | 0.69 | 8 | 31 | 3.4 | | | | 499 |
| 2 | Wheat flour, acid modified | 1.01 | 3 | 30 | | 1.47 | 9.0 | 4 | 180 |
| 3 | Wheat flour, acid modified (of Run 2) then hydroxyethylated | 1.01 | 8 | 32 | 2.1 | 1.47 | 9.0 | 4 | 142 |
| 4 | Wheat flour, acid modified | 1.37 | 6 | 25 | | 2.10 | 9.5 | 6 | 161 |
| 5 | ...do | 1.16 | 1 | 30 | | 1.47 | 9.9 | 4 | 161 |
| 6 | ...do | 1.00 | 6 | 28 | | 1.64 | 11.0 | 4 | 142 |
| 7 | ...do | 1.41 | 6 | 28 | | 2.44 | 11.0 | 6 | 36 |
| 8 | Wheat flour hydroxyethylated, then acid modified | 0.70 | 6 | 28 | 3.0 | 2.10 | 10.0 | 6 | 233 |
| 9 | Sorghum flour, acid modified | 1.00 | 6 | 28 | | 1.15 | 10.0 | 3 | 421 |
| 10 | Corn flour, acid modified | 1.29 | 6 | 28 | | 1.46 | 9.8 | 4 | 113 |
| 11 | Corn flour, acid modified (of Run 10) then hydroxyethylated | 1.29 | 7.5 | 29 | 3.0 | 1.46 | 9.8 | 4 | 74 |

Tables II and III set forth paste viscosity values, the spectrophotometrically obtained "blue values" (showing the extent of undepolymerized linear (amylose) molecules present or remaining in a starchy material), and the burst strength values of paper sized with the unpregelatinized acid modified flours of our invention as compared with corresponding values for starches and flours that were pregelatinized before drying and treating with acid in precisely the same manner as the unpregelatinized acid modified flours of our invention. For comparison we tested a proprietary brand of unpregelatinized acid modified starch ("Eagle" Brand 2 Star Corn Starch 5082 made by Corn Products Co., Argo, Illinois); a proprietary brand of pregelatinized and acid modified starch ("Amidex" Brand, B–518, made by Corn Products Co.); a proprietary brand of pregelatinized but chemically unmodified starch ("Amijel," B–011 starch, made by Corn Products Co.); and a proprietary brand of white dextrin ("Stadex 60" made by the E. H. Staley Co., Decatur, Illinois). Also, the data for comparison products E–I of Table II clearly show that operative products are not obtained even with our specific conditions if these are applied to pregelatinized flour instead of to flour in the granule state. Setback values were made with a Brookfield Synchro-Lectric viscometer after a Bradender amylograph run. The term "setback" is a recognized term for the increase in the viscosity of a starchy paste on ageing at a constant temperature. A smaller increase in the viscosity of an ageing paste indicates a lesser tendency of the paste to retrograde.

It will be noted in Table II that 20 percent pastes of the pregelatinized acid modified flours as well as the pastes of the proprietary ungelatinized acid modified starch, and of the proprietary pregelatinized starch which we had modified with acid in the manner of this invention formed gels and are, therefore, not usable in modern continuous and high speed sizing and coating operations. Also, when one depolymerizes the polymer molecules to practicable viscosity levels (as in the proprietary pregelatinized acid modified starch or in the pregelatinized acid modified flours) the depolymerization is unselective and only about 45–80 percent of the strength-contributing linear molecules remain, as is also shown by the sized paper burst, fold, and tensile strength values shown in Table III. Items M—H of Table III show inoperative products obtained by avoiding one or more of the aforesaid essential parameters of our improved process.

L). On the contrary, under the acid-modification procedure of our invention the tendency to setback is reduced with minimum amounts of modification of the linear fraction thus permitting substantial improvement in the prod-

*Table II*

| Material | HCl added, Percent | Paste viscosity, 20%, cps. | | | Percent of linear molecules remaining after modification (by Blue Value calc'n.) |
|---|---|---|---|---|---|
| | | Amylograph at 55° C. | Brookfield, setback 25° C. | | |
| | | | 1 hr. | 24 hr. | |
| A "Eagle" brand 2 Star Corn Starch 5082 ungelatinized acid-modified starch | | 421 | 5,000 | Gelled | 89 |
| B "Amidex" brand B-518 acid-modified starch | | 55 | 200 | 1,100 | 46 |
| C "Amijel" brand B-011, of pregelatinized starch, then acid modified | ¹0.8 | 1,732 | Gelled | Gelled | 87 |
| D "Amijel" brand, B-011, of pregelatinized starch, then acid modified | ¹1.7 | Gelled | Gelled | Gelled | 74 |
| E Pregelatinized wheat flour (soft) acid modified | ¹0.8 | Gelled | Gelled | Gelled | 100 |
| F Pregelatinized wheat flour (soft) acid modified | ¹1.7 | 1,067 | Gelled | Gelled | 96 |
| G Pregelatinized wheat flour (soft) acid modified | ¹2.5 | 277 | 2,580 | 5,400 | 80 |
| H Pregelatinized wheat flour (soft) acid modified | ¹2.8 | 180 | 1,980 | 4,100 | 78 |
| I Pregelatinized wheat flour (soft) acid modified | ¹2.9 | 152 | 1,080 | 1,700 | 76 |
| J Ungelatinized wheat flour (soft) (8.8% protein content); acid modified | ¹1.6 | 142 | 705 | 960 | 100 |
| K Ungelatinized wheat flour (hard) (14.3% protein content); acid modified | ¹2.4 | 103 | 625 | 880 | 97 |

¹ The general procedure of Example 1 was followed for products C-K, the starting material, and amount of acid being varied as shown.

Paper handsheets were tub sized with cooked paste of our modified products at 55° C. and then tested for strength improvements by conventional methods. Modified starch-bearing products shown below (Table III) have been depolymerized to meet the low viscosity specifications at high solids concentration demanded in industrial applications. But results shown that in order to reduce the setback or gelling tendency of paste products (Tables II and III, A, B, L,) prepared by conventional methods of acid treatments or dextrinizations, approximately 50 percent or more of the amylose present is modified. However, even though this linear fraction is sufficiently modified to reduce its tendency to retrograde, inherent strength characteristics of the starchy products are considerably reduced by the degradation as shown by the smaller percentages of improvements in strength quality of the paper treated with such materials (Table III, B, ucts' ability to develop unusual strength properties in paper when it is applied thereto as a size or coating (Table III, Q, K, J, and R).

Also shown in Table III are properties of acid modified products (M, N, O, P) prepared by our process varying one of its critical parameters (moisture or temperature) to define their limits. It is readily seen that those products made outside the limits of our preferred process show both a reduction in the percentage of linear molecules remaining after modification and a lowering of the percentage of increase in strength properties of paper size with these materials as compared to those results found for the preferred products (Table III, Q, K, J, and R).

*Table III*

| Sample | Preparation | | Plate viscosity 20%, cps. | | | Percent linear molecules remaining | Paper sizing sheets | | Machine fold (machine direction only) | Tensile break length meters (machine direction only) |
|---|---|---|---|---|---|---|---|---|---|---|
| | Moisture, percent | Temp., ° C. | Amylograph at 55° C. | Brookfield, setback, 25° C. | | | Weight percent of size in paper unsized | Burst value, pts./100 lbs. | | |
| | | | | 1 hr. | 1 week | | | | | |
| | | | | | | Control | | 31.8 | 40 | 4,350 |
| B "Amidex" brand, B-518, pregelatinized acid-modified starch | | | 55 | 200 | 1,440 | 46 | 3.9 | 37.9 | 50 | 4,580 |
| L "Stadex 60" brand of starch dextrin, white | | | 17 | 10 | 13 | 22 | 3.5 | 37.0 | 37 | 4,380 |
| M Acid-modified wheat flour (hard) | 2.61 | 70 | 26 | 45 | 45 | 22 | 4.7 | 37.4 | 52 | 4,410 |
| N Acid-modified wheat flour (hard) | 2.61 | 45 | 161 | 1,060 | 2,500 | 76 | 3.5 | 39.8 | 58 | 4,690 |
| O Acid-modified wheat flour (hard) | 1.28 | 45 | 364 | 3,600 | 9,800 | 74 | 3.2 | 39.6 | 60 | 4,740 |
| P Acid-modified wheat flour (hard) | 1.60 | 28 | 132 | 695 | 4,800 | 80 | 4.5 | 40.6 | 54 | 4,700 |
| H Acid-modified pregelatinized wheat flour (Product H in Table II) | 0.69 | 28 | 180 | 1,980 | 4,700 | 78 | 3.3 | 38.9 | 60 | 4,830 |
| Q Acid-modified wheat flour (hard) of Ex. 2 | 0.69 | 30 | 576 | 5,700 | 6,800 | 98 | 3.5 | 45.4 | 160 | 5,170 |
| K Acid-modified wheat flour (hard) of Ex. 2 | 1.16 | 28 | 103 | 625 | 1,000 | 97 | 2.8 | 44.5 | 70 | 5,120 |
| J Acid-modified wheat flour (soft) of Ex. 4, (run 6 of Table I) | 1.00 | 28 | 142 | 705 | 880 | 100 | 3.9 | 45.3 | 77 | 5,210 |
| R Hydroxyethylated acid-modified flour (hard) of Ex. 4, (run 1 of Table I)¹ | 0.69 | 31 | 499 | 4,300 | 5,400 | 98 | 4.4 | 46.6 | 95 | 6,160 |

¹ 3.4 percent C₂H₄O.

Having thus described our invention, we claim:

A method of preferentially depolymerizing the amylopectin fraction of unpregelatinized flour, comprising drying the raw flour to a moisture content of between 0.7 percent and about 1.4 percent, spraying the dried flour with 9 ml. to 11 ml. of a 2 N to 6 N aqueous solution of hydrochloric acid per 100 grams of pre-dried flour so as to provide between 0.8 and 2.5 percent of said acid, based on the flour, agitating the acidified flour at 25°–40° C. for 1 to 8 hours, neutralizing the acids in the flour to terminate the acidic reaction, and recovering a free-flowing powder in granule form, the granules being characterized by containing substantially the original amount of undepolymerized amylose, as shown by Blue value; and being further characterized in that a 20 percent cooked paste thereof has an amylograph viscosity of 40–600 cps. at 55° C. and substantially no tendency on cooling to set back and retrograde.

References Cited in the file of this patent

UNITED STATES PATENTS

| | | |
|---|---|---|
| 2,818,357 | Ziegler et al. | Dec. 31, 1957 |
| 2,833,759 | Hobbs et al. | May 6, 1958 |

UNITED STATES PATENT OFFICE
CERTIFICATE OF CORRECTION

Patent No. 3,073,724 January 15, 1963

John C. Rankin et al.

It is hereby certified that error appears in the above numbered patent requiring correction and that the said Letters Patent should read as corrected below.

Column 5, line 37, for "shown" read -- show --; columns 5 and 6, Table III, third heading, for "Plate viscosity 20%, cps." read -- Paste viscosity 20%, cps. --; same table, "Sample K" for "Ex. 2" read -- Ex. 1 --.

Signed and sealed this 30th day of July 1963.

(SEAL)
Attest:

ERNEST W. SWIDER
Attesting Officer

DAVID L. LADD
Commissioner of Patents